United States Patent
Eidson et al.

(10) Patent No.: US 6,795,512 B1
(45) Date of Patent: Sep. 21, 2004

(54) SYSTEM FOR CARRIER PHASE TRACKING OF CODED SYMBOLS USING RELIABILITY METRICS FOR SYMBOL ESTIMATES

(75) Inventors: Donald Brian Eidson, San Diego, CA (US); Ramaswamy Murali, San Diego, CA (US); Abraham Krieger, San Diego, CA (US); Magnus H. Berggren, San Diego, CA (US)

(73) Assignee: Conexant Systems, Inc., Newport Beach, CA (US)

(*) Notice: Subject to any disclaimer, the term of this patent is extended or adjusted under 35 U.S.C. 154(b) by 747 days.

(21) Appl. No.: 09/715,877

(22) Filed: Nov. 17, 2000

(51) Int. Cl.[7] .................................................. H04L 27/06

(52) U.S. Cl. ........................................ 375/341; 375/262

(58) Field of Search ................................ 375/341, 376, 375/147, 325, 327, 229, 262, 340, 240.01, 141, 222, 265; 714/795; 370/335, 342

(56) References Cited

U.S. PATENT DOCUMENTS

| | | | | |
|---|---|---|---|---|
| 5,724,390 A | * | 3/1998 | Blaker et al. ................ | 375/229 |
| 5,729,558 A | * | 3/1998 | Mobin ........................ | 714/795 |
| 6,023,783 A | | 2/2000 | Divsalar et al. ............ | 714/792 |
| 6,236,687 B1 | * | 5/2001 | Caso et al. .................. | 375/327 |
| 6,456,671 B1 | * | 9/2002 | Patire ......................... | 375/325 |
| 6,498,805 B1 | * | 12/2002 | Brown et al. ............... | 375/147 |

OTHER PUBLICATIONS

"A practical reliability metric for block codes used on binary–input channels", Loeliger, H.–A.; Communications, IEEE Transactions on, vol.: 38, Issue: 4, Apr. 1990 pp.: 405–408.*

Hagenauer, Joachim and Hoeher, P., *A Viterbi Algorithm with Soft–Decision Outputs and its Applications*; Proceedings of IEEE Globecom '89; Dallas, Texas, Nov. 1989; pp. 47.1.1–47.1.7.

Hoeher, Peter and Lodge, John, *"Turbo DPSK": Iterative Differential PSK Demodulation and Channel Decoding*; IEEE Transactions on Communications, vol. 47, No. 6, Jun. 1999, pp. 837–843.

(List continued on next page.)

*Primary Examiner*—Stephen Chin
*Assistant Examiner*—Ted Wang
(74) *Attorney, Agent, or Firm*—Howrey, Simon, Arnold & White, LLP

(57) ABSTRACT

A system for carrier phase tracking of symbols. In an embodiment employing a feedback structure, a symbol derotator pre-rotates a symbol by a derotation phase. A symbol and reliability estimation engine provides, responsive to the pre-rotated symbol, an estimate of the symbol and a reliability metric for the estimate. A tracking loop module determines a residual between the pre-rotated symbol and the symbol estimate, weights the residual by the reliability metric for the estimate, and determines a phase offset estimate responsive to the weighted residual. An accumulator then determines a next derotation phase responsive to the phase offset estimate. In an embodiment employing a feed-forward structure, a symbol and reliability estimation engine provides an estimate of a symbol and a reliability metric for the estimate. A tracking loop module determines a residual between the symbol and the symbol estimate, weights the residual by the reliability metric for the estimate, and determines a derotation phase responsive to the weighted residual.

58 Claims, 11 Drawing Sheets

OTHER PUBLICATIONS

Narayanan, Krishna R. and Stüber, Gordon L., *A Serial Concatenation Approach to Iterative Demodulation and Decoding*; IEE Transactions on Communications, vol. 47, No. 7, Jul. 1999, pp. 956–961.

Robertson, P., et al., *A Comparison of Optimal and Sub-Optimal MAP Decoding Algorithms Operating in the Log Domain*; IEEE, 1995, pp. 1009–1013.

Viterbi, Andrew J., *An Intuitive Justification and a Simplified Implementation of the MAP Decoder for Convulational Codes*; IEEE Journal on Selected Areas in Communications, vol. 16, No. 2, Feb. 1998, pp. 260–264.

Bahl, L. R., et al., *Optimal Decoding of Linear Codes for Minimizing Symbol Error Rate*; IEEE Transactions on Information Theory, Mar. 1974, pp. 284–287.

Benedetto, S., et al., *A Soft–Input Soft–Output Maximum A Posteriori (MAP) Module to Decode Parallel and Serial Concatenated Codes*; TDA Progress Report, 42–127, Nov. 1996, pp. 1–20.

Benedetto, S. and Montorsi, G., *Iterative decoding of serially concatenated convolutional codes*; Electronics Letters, vol. 32, No. 13, Jun. 1996, pp. 1186–1188.

Benedetto, S. and Montorsi, G., *Serial concatenation of block and convolutional codes*; Electronics Letters, vol. 32, No. 10, May 1996, pp. 887–888.

Berrou, Claude, et al., *New Shannon Limit Error—Correcting Coding and Decoding: Turbo–Codes (1)*; IEEE, 1993, pp. 1064–1070.

Divsalar, D. and Pollara, F., *Serial and Hydrid Concatenated Codes with Applications*; Jet Propulsion Laboratory, California Institute of Technology, pp. 1–8.

Divsalar, D. and Pollara, F., *Turbo Trellis Coded Modulation wth Iterative Decoding for Mobile Satellite Communications*; Jet Propulsion Laboratory, California Institute of Technology, pp. 1–7.

* cited by examiner

SYSTEM FOR CARRIER PHASE TRACKING OF CODED SYMBOLS USING RELIABILITY METRICS FOR SYMBOL ESTIMATES

BACKGROUND OF THE INVENTION

1. Field of the Invention

This invention generally relates to the carrier phase tracking of coded symbols, and, more specifically, to the use of reliability metrics of symbol estimates in the tracking process.

2. Related Art

During the decoding of coded symbols, particularly higher order symbols such as 8-PSK or QAM, there is a risk of cycle slippage of the symbol constellation. Cycle slippage is devastating to receiver performance. When it occurs, the symbol constellation rotates with respect to its true orientation such that another ostensibly valid constellation is interpreted at the receiver. This renders as useless all data decoded afterward. The problem is compounded with low operating $E_b/N_o$ values, or with high phase noise in the demodulator oscillator or downconversion circuits. For example, at low $E_b/N_o$ values, 8-PSK symbol error rates of 20–30% have been experienced. At such high error rates, decision-oriented phase tracking loops can experience great difficulty in following phase trends induced by instabilities of the demodulator oscillator and downconversion circuitry.

SUMMARY

The invention provides a system for carrier phase tracking of coded symbols in which reliability metrics for the symbol estimates are used. Embodiments with a feed forward or feedback structure are possible.

In an embodiment with the feedforward structure, a received symbol is input to a tracking loop which includes a series combination of a symbol and reliability estimation engine, a tracking loop module, and a symbol derotator. The engine estimates the symbol, and also determines a reliability metric for the estimate.

The symbol estimate and reliability metric are input to the tracking loop module which determines a residual between the received symbol and its estimate. The residual may be a phase residual. The reliability metric for the estimate is used to weight the residual for the symbol. A derotation phase θ is then determined responsive to the weighted residual. Optionally, one or more previous weighted residuals and one or more previous derotation phases are used in this process. A symbol derotator then derotates the symbol by the derotation phase θ. A delay element ensures proper synchronization of this process. The resulting phase adjusted symbol is then output by the derotator. The process may then repeat itself for subsequent symbols.

In one embodiment of the feedforward structure, the operation of this tracking loop may generally be described by the following expression:

$$\theta_k = \sum_{i=1}^{N} a_i \cdot \theta_{k-i} + \sum_{i=0}^{M-1} b_i \cdot R_{k-i} \cdot z_{k-i}$$

In this expression, $\theta_k$ is the derotation phase at time k, $\theta_{k-i}$ represents a previous value of the derotation phase at time k–i, $a_i$ is a coefficient applied to $\theta_{k-i}$, $z_{k-i}$ is a residual derived from $r_{k-i}$, the (k–i)th received symbol and $s_{k-i}$, the estimate of that symbol, $R_{k-i}$ is the reliability metric for the estimate of the (k–i)th symbol, $b_i$ is a coefficient applied to $R_{k-i} \cdot z_{k-i}$, and N and M are non-negative integers. In one embodiment, the residual $z_{k-i}$ is $e_{k-i}$, the phase residual between $r_{k-i}$ and $s_{k-i}$. In another embodiment, the residual $z_{k-i}$ is the component of $r_{k-i}$ orthogonal to $s_{k-i}$.

In an embodiment with the feedback structure, a received symbol is input to a tracking loop which includes a series combination of a symbol derotator, a symbol and reliability estimation engine, and a tracking loop module. The received symbol is pre-rotated by the derotator using the best estimate of the derotation phase which is available at the time. The pre-rotated symbol is then input to the symbol and reliability estimation engine, which estimates the symbol, and also provides a reliability metric for the estimate. In the tracking loop module, a residual between the pre-rotated symbol and the estimate of that symbol is formed. The residual may be a phase residual. The residual is weighted by the reliability metric for the corresponding symbol estimate. A phase offset estimate is then determined responsive to the weighted residual. Optionally, one or more previous values of the weighted residuals, and one or more previous values of the phase offset estimate are used in this process. The phase offset estimate is then added to the value of the derotation phase (the one used to pre-rotate the symbol in the first place) to determine the next value of the derotation phase. Meanwhile, the pre-rotated symbol is output by the derotator. The process may then repeat itself for subsequent symbols.

In one embodiment of the feedback structure, the operation of the tracking loop may generally be described by the following two step process:

$$\Delta\theta_{k+1} = \sum_{i=0}^{N-1} a_i \cdot \Delta\theta_{k-i} + \sum_{i=0}^{M-1} b_i \cdot R_{k-i} \cdot z_{k-i}$$

$$\theta_{k+1} = \theta_k + \Delta\theta_{k+1}$$

In this expression, $\theta_{k+1}$ is the derotation phase at time k+1, $\theta_{k+1}$ is the phase offset estimate at time k+1, $\theta_{k-i}$ represents a previous value of the phase offset estimate at time k–i, $a_1$ is a coefficient applied to $\theta_{k-i}$, $z_{k-i}$ is a residual derived from $r_{k-i}$, the (k–i)th received symbol and $s_{k-i}$, the estimate of that symbol, $R_{k-i}$ is the reliability metric for the estimate of the (k–i)th symbol, $b_i$ is a coefficient applied to $R_{k-i} \cdot z_{k-i}$, and N and M are non-negative integers. Note that the coefficients $a_1$ and $b_i$ between this embodiment and the feedfoward embodiment.

In one embodiment, the residual $z_{k-i}$ is $x_{k-i}$, the phase residual between $t_{k-i}$, the pre-rotated value of the received symbol $r_{k-i}$, and the estimate of that symbol, $s_{k-i}$. In another embodiment, the residual $z_{k-i}$ is the component of $t_{k-i}$ orthogonal to $s_{k-i}$.

In one example of the embodiment employing the feedback structure, the tracking loop employs a first order loop to determine the derotation phase θ. This first order loop can be expressed as follows:

$$\Delta\theta_{k+1} = B \cdot R_k \cdot x_k$$

$$\theta_{k+1} = \theta_k + \Delta\theta_{k+1}$$

where $\theta_{k+1}$, $\Delta\theta_{k+1}$, $\theta_k$, $R_k$, and $x_k$ are as defined previously, and B is a parameter which is proportional to the nominal loop bandwidth. The parameter B is typically less than 1 and a constant, and is configured to take account of noise. Typically, the more noise in the system, the smaller B is, and vice-versa. Note that the effective loop bandwidth in this example, $B \cdot R_k$, can vary from sample to sample, depending on the reliability $R_k$ of the symbol estimate from which $x_k$ is computed.

In a second example of the embodiment employing the feedback structure, the tracking loop module employs a higher order loop to determine the derotation phase θ. This higher order loop may be expressed as follows:

$$\Delta\theta_{k+1} = B \cdot \sum_{i=0}^{M-1} R_{k-i} \cdot x_{k-i}$$

$$\theta_{k+1} = \theta_k + \Delta\theta_{k+1}$$

where the parameters $\theta_{k+1}$, $\Delta\theta_{k+}$, $\theta_k$, $B$, $R_{k-i}$, $x_{k-i}$ and M are as defined previously.

According to a third example of the embodiment employing the feedback structure, a technique is used in which a sinusoid of a function of the incremental phase residual at time k is used to update the derotation phase. In this example, the operation of the tracking loop may be represented by the following two step process:

$$\Delta\theta_{k+1} = B \cdot R_k \cdot \sin(C \cdot x_k)$$

$$\theta_{k+} \theta_k + \Delta\theta_{k+1}$$

where the parameters $\theta_{k+}$, $\Delta\theta_{k+1}$, $\theta_k$, $B$, $R_k$, and $x_k$ are as defined previously and C is a constant such that, when $x_k$ obtains its maximum value, $\sin(C \cdot x_k)=0$.

In a fourth example of the embodiment employing the feedback structure, the derotation phase at time k+1, $\theta_{k+1}$, is determined in accordance with the following formula:

$$\Delta\theta_{k+1} = \Delta\theta_k + B \cdot R_k \cdot y_k$$

$$\theta_{k+} \theta_k + \Delta\theta_{k+1}$$

In this example, the residual $y_k$ is the component of $t_k$ which is orthogonal to $s_k$ determined in accordance with the following formula:

$$y_k = |t_k| \cdot \sin\phi_k$$

where $t_k$ is the vector on the I-Q plane representing a pre-rotated received symbol $r_k$, $s_k$ is the vector on the I-Q plane representing the estimate of $r_k$, and $\phi_k$ is the phase difference between $t_k$ and $s_k$.

In an example of the embodiment employing the feedfoward structure, the derotation phase at time k, $\theta_k$, is determined in accordance with the following formula:

$$\theta_k = \theta_{k-1} + B \cdot R_k \cdot e_k$$

where the parameters $\theta_k$, $\theta_{k-1}$, $B$, $R_k$, and $e_k$ are as defined previously.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
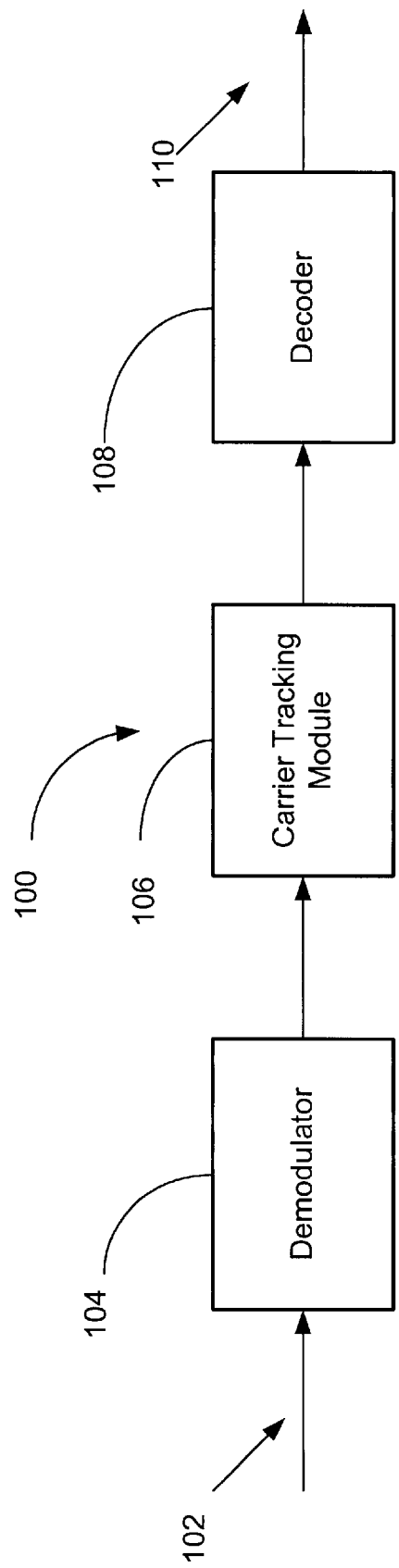
FIG. 1 is a block diagram of a first embodiment of a receiver incorporating the subject invention.

A block diagram of a first embodiment of a receiver 100 according to the invention is illustrated in FIG. 1. As illustrated, modulated channel symbols 102 are received over a communications channel, and demodulated by demodulator 104. The demodulated symbols are input to carrier tracking module 106. Carrier tracking module 106 derotates the demodulated symbols to perform carrier phase tracking. In one implementation, the output of demodulator 104 is a complex baseband signal having I and Q components, and carrier tracking module 106 derotates this complex signal by an angle θ. The derotated symbols output by module 106 are then input to decoder 108 which decodes the symbols. The output of decoder 108 comprises decoded source bits 110.

Figure 2A:
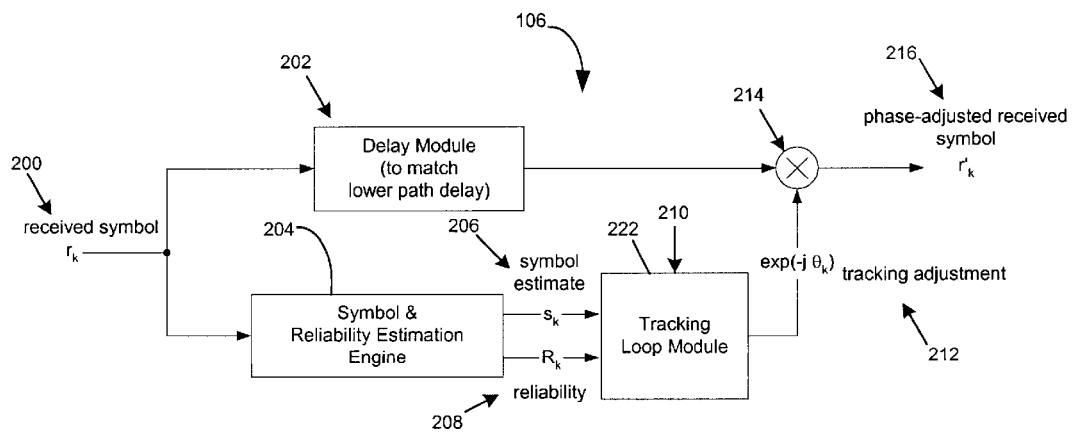
FIGS. 2A–2B illustrate embodiments of a carrier tracking module in accordance with the subject invention.

A first embodiment of the carrier phase tracking module 106 is illustrated in FIG. 2A. This embodiment employs a feedforward structure to determine the derotation phase θ. A received symbol $r_k$, identified with numeral 200, is input to a tracking loop which includes a series combination of symbol and reliability estimation engine 204, tracking loop module 222, and symbol derotator 214. In parallel with the input to the tracking loop, the received symbol is input to delay module 202.

The engine 204 estimates the symbol, and also determines reliability metric for the estimate. The estimate $s_k$ is identified with numeral 206, and the reliability metric $R_k$ for the estimate is identified with numeral 208. Engine 204 may be any module which provides estimates of the symbols, and reliability metrics for those estimates. For example, this module may be or input any soft output decoder, including, without limitation, a Soft Input Soft Output (SISO) decoder, a Maximum A Posteriori (MAP) decoder, a log-MAP decoder, a max-log-MAP decoder, or a Soft Output Viterbi (SOVA) decoder. It may also be or include a Viterbi decoder.

The symbol estimate 206 and reliability metric 208 are input to the tracking loop module 222 which determines a residual between the received symbol 200 and its estimate

206. The residual may be a phase residual. The reliability metric 208 for the estimate is used to weight the residual for the symbol. A derotation phase θ is then determined responsive to the weighted residual. Optionally, one or more previous weighted residuals and one or more previous derotation phases may be used in this process.

Optionally, module 222 may employ other inputs 210 for updating the derotation phase. For example, known pilot symbols may be interspersed throughout the stream of received symbols embodied in a baseband signal. The baseband signal including the interspersed pilot symbols could then form input 210 to module 222. Upon encountering a pilot symbol, module 222 would determine the derotation phase assuming perfect reliability.

A symbol derotator 214 then derotates the symbol by the derotation phase θ. In one implementation, the symbol derotator 214 is a modulator which derotates a symbol by multiplying a quadrature baseband signal embodying the symbol by a complex exponential $e^{-j\theta}$. A delay element 202 ensures proper synchronization of this process. In particular, the delay 202 compensates for the lower path delay, i.e., the delay through engine 204 and tracking loop module 222, and thereby ensures a proper match at derotator 214 between the received symbol 200 and the derotation phase corresponding to that symbol. The derotated symbol 216 from derotator 214 is then output by module 106. The process may then repeat itself for subsequent symbols.

In one embodiment of the feedforward structure, the operation of this tracking loop may generally be described by the following expression:

$$\theta_k = \sum_{i=1}^{N} a_i \cdot \theta_{k-i} + \sum_{i=0}^{M-1} b_i \cdot R_{k-i} \cdot z_{k-i} \tag{1}$$

In this expression, $\theta_k$ is the derotation phase at time k, $\theta_{k-i}$ represents a previous value of the derotation phase at time k-i, $a_i$ is a coefficient applied to $\theta_{k-i}$, $z_{k-i}$ is a residual derived from $r_{k-i}$, the (k-i)th received symbol and $s_{k-i}$, the estimate of that symbol, $R_{k-i}$ is the reliability metric for the estimate of the (k-i)th symbol, bi is a coefficient applied to $R_{k-1} \cdot z_{k-i}$, and N and M are non-negative integers. In one embodiment, the residual $z_{k-i}$ is $e_{k-i}$, the phase residual between $r_{k-i}$ and $s_{k-i}$. In another embodiment, the residual $z_{k-i}$ is the component of $r_{k-i}$ orthogonal to $s_{k-i}$.

Figure 2B:
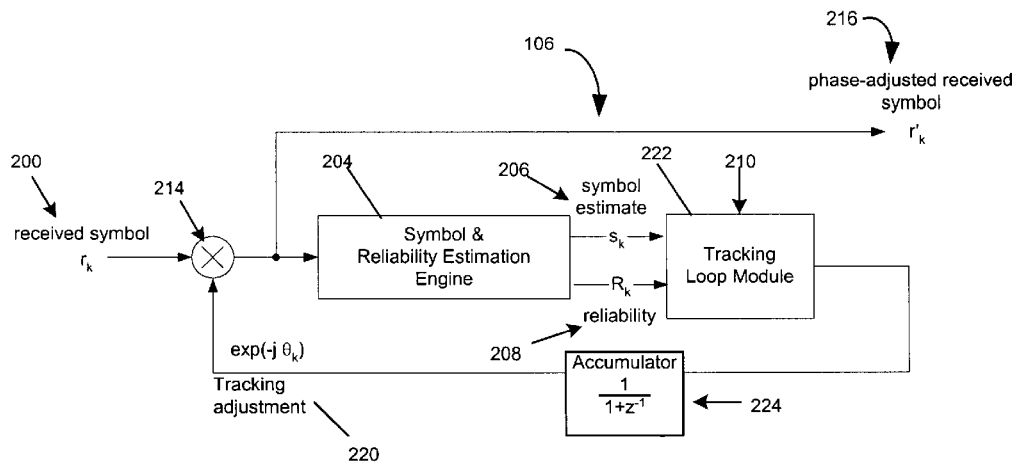

A second embodiment of the carrier phase tracking module 106 is illustrated in FIG. 2B. This embodiment employs a feedback structure to determine the derotation phase θ. In this embodiment, a received symbol 200 is input to a tracking loop which includes a series combination of symbol derotator 214, symbol and reliability estimation engine 204, and tracking loop module 210.

The received symbol 200 is pre-rotated by the derotator 214 using the best estimate of the derotation phase which is available at the time. In one implementation, where symbol derotator 214 is a modulator, this is accomplished by multiplying a baseband signal embodying the symbol by a complex sinusoid $e^{-j\theta}$, identified with numeral 220 in the figure.

The pre-rotated symbol 216 is then input to the symbol and reliability estimation engine 204, which estimates the symbol, and also provides a reliability metric for the estimate. The estimate $s_k$ of the symbol is identified with numeral 206, and the reliability metric for the symbol estimate is identified with numeral 208. As with the previous embodiment, engine 204 may be any module which provides estimates of the symbols, and reliability metrics for those estimates. For example, this module may be or input any soft output decoder, including, without limitation, a Soft Input Soft Output (SISO) decoder, a Maximum A Posteriori (MAP) decoder, a log-MAP decoder, a max-log-MAP decoder, or a Soft Output Viterbi (SOVA) decoder. It may also be or include a Viterbi decoder.

In the tracking loop module 222, a residual between the pre-rotated symbol and the estimate of that symbol is formed. The residual may be a phase residual. The residual is weighted by the reliability metric 208 for the corresponding symbol estimate 206. A phase offset estimate is then determined responsive to the weighted residual. Optionally, one or more previous values of the weighted residuals, and one or more previous values of the phase offset estimate are used in this process.

As with the previous embodiment, the tracking loop module 222 may employ other inputs to determine the phase offset estimate Δθ. One such input is identified by numeral 210. As with the feedback structure, such an input may be derived from various sources, including other tracking loops and even a signal embodying the received symbols 200. In one implementation, known pilot symbols are interspersed throughout such a signal. The tracking loop module 222, upon encountering a pilot symbol, may determine the phase offset estimate assuming perfect reliability.

The phase offset estimate is then input to accumulator 224. Accumulator 224 adds the phase offset estimate to the value of the derotation phase (the one used to pre-rotate the symbol in the first place) to determine the next value of the derotation phase. Meanwhile, the pre-rotated symbol 216 is output by the derotator. The process may then repeat itself for subsequent symbols.

In one embodiment of the feedback structure, the operation of the tracking loop may generally be described by the following two step process:

$$\Delta\theta_{k+1} = \sum_{i=0}^{N-1} a_i \cdot \Delta\theta_{k-i} + \sum_{i=0}^{M-1} b_i \cdot R_{k-i} \cdot z_{k-i} \tag{2}$$

$$\theta_{k+1} = \theta_k + \Delta\theta_{k+1} \tag{3}$$

In these expressions, $\theta_{k+1}$ is the derotation phase at time k+1, $\Delta\theta_{k+1}$ is the phase offset estimate at time k+1, $\Delta\theta_{k-i}$ represents a previous value of the phase offset estimate at time k-i, as is a coefficient applied to $\Delta\theta_{k-i}$, $z_{k-i}$ is a residual derived from $r_{k-i}$, the (k-i)th received symbol and $s_{k-i}$, the estimate of that symbol, $R_{k-i}$ is the reliability metric for the estimate of the (k-i)th symbol, $b_i$ is a coefficient applied to $R_{k-i} \cdot z_{k-i}$, and N and M are non-negative integers. Note that the coefficients $a_i$ and $b_i$ will generally differ between this embodiment and the feedfoward embodiment.

In one embodiment, the residual $z_{k-i}$ is $x_{k-i}$, the phase residual between $t_{k-i}$, the pre-rotated value of the received symbol $r_{k-i}$, and the estimate of that symbol, $s_{k-i}$. In another embodiment, the residual $z_{k-i}$ is the component of $t_{k-i}$ orthogonal to $s_{k-i}$.

Figure 3:
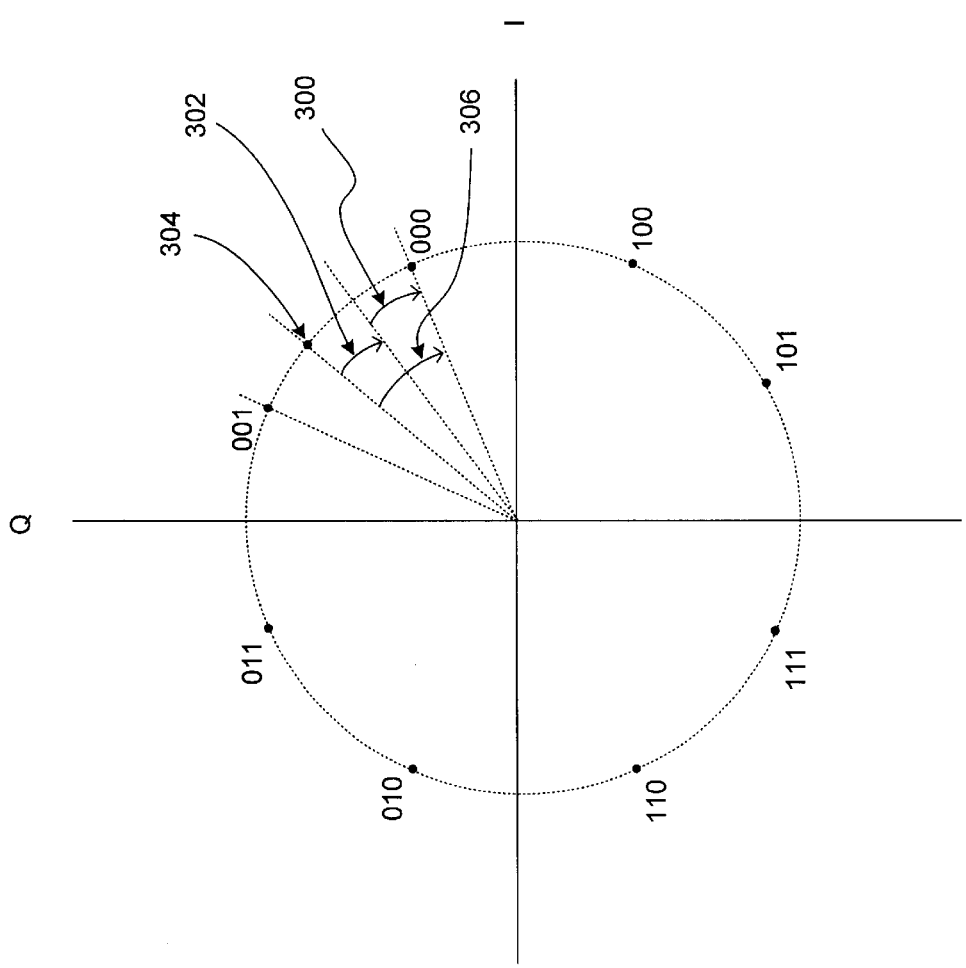
FIG. 3 illustrates the difference between incremental and absolute phase residuals in the context of an 8-PSK coding constellation.

FIG. 3 illustrates the difference between the phase residual $e_k$ and the phase residual $x_k$ in the context of an example involving 8-PSK symbols. In the figure, an input symbol at time k is identified with numeral 304. It is assumed that a reliable estimate of that symbol is 000. The derotation phase at time k, $\theta_k$, is identified with numeral 302. The phase residual $x_k$, which is the phase difference between the input symbol 304 and the estimate 000, after accounting for $\theta_k$, is identified with numeral 300. The phase residual $e_k$, which is the phase difference between the input symbol 304 and the estimate 000, before accounting for $\theta_k$, is identified with numeral 306.

In one example of the embodiment of FIG. 2B, the tracking loop employs a first order loop to determine the derotation phase θ. This first order loop can be expressed as follows:

$$\Delta\theta_{k+1} = B \cdot R_k \cdot x_k \quad (4)$$

$$\theta_{k+1} = \theta_k + \Delta\theta_{k+1} \quad (5)$$

where $\theta_{k+1}$, $\Delta\theta_{k+1}$, $\theta_k$, $R_k$, and $x_k$ are as defined previously, and B is a parameter proportional to the nominal loop bandwidth. The parameter B is typically less than 1 and a constant. It is configured to take account of noise. Typically, the more noise in the system, the smaller B is, and vice-versa. Note that the effective loop bandwidth in this example, $B \cdot R_k$, can vary from sample to sample, depending on the reliability $R_k$ of the symbol estimate from which $x_k$ is computed.

In a second example of the embodiment of FIG. 2B, the tracking loop employs a higher order loop to determine the derotation phase θ. This higher order loop may be expressed as follows:

$$\Delta\theta_{k+1} = B \cdot \sum_{i=0}^{M-1} R_{k-i} \cdot x_{k-i} \quad (6)$$

$$\theta_{k+1} = \theta_k + \Delta\theta_{k+1} \quad (7)$$

where the parameters $\theta_{k+1}$, $\Delta\theta_{k+1}$, $\theta_k$, M, B, $R_{k-i}$, and $x_{k-i}$ are as defined previously.

According to a third example of the embodiment of FIG. 2B, a technique is used in which a sinusoid of a function of the phase residual $x_k$ at time k is used to update the derotation phase. In this example, the operation of the tracking loop may be represented by the following two step process:

$$\Delta\theta_{k+1} = B \cdot R_k \cdot \sin(C \cdot x_k) \quad (8)$$

$$\theta_{k+1} = \theta_k + \Delta\theta_{k+1} \quad (9)$$

where the parameters $\theta_{k+1}$, $\Delta\theta_{k+1}$, $\theta_k$, B, $R_k$, and $x_k$, are as defined previously and C is a constant such that, when $x_k$ obtains its maximum value, $\sin(C \cdot x_k) = 0$.

According to a fourth example of the embodiment of FIG. 2A, $t_k$, the vector on the I-Q plane representing a pre-rotated received symbol, is referenced with respect to $s_k$, the vector on the I-Q plane representing the symbol estimate. The component $y_k$ of $t_k$ orthogonal to $s_k$ is then determined in accordance with the following formula:

$$y_k = |t_k| \cdot \sin\phi_k \quad (10)$$

where $\phi_k$ is the phase difference between $t_k$ and $s_k$. The derotation phase at time k+1, $\theta_{k-1}$, may then be determined by the following formula:

$$\theta_{k+1} = \theta_k + B \cdot R_k \cdot y_k \quad (11)$$

where the parameters $\theta_{k+1}$, $\theta_k$, B, $R_k$, and $y_k$ are as defined previously.

In an example of the embodiment employing the embodiment of FIG. 2A, the derotation phase at time k+1, $\theta_{k+1}$, may be determined in accordance with the following formula:

$$\theta_k = \theta_{k-1} + B \cdot R_k \cdot e_k \quad (12)$$

where the parameters $\theta_k$, $\theta_{k-1}$, B, $R_k$, and $e_k$ are as defined previously.

Figure 4A:
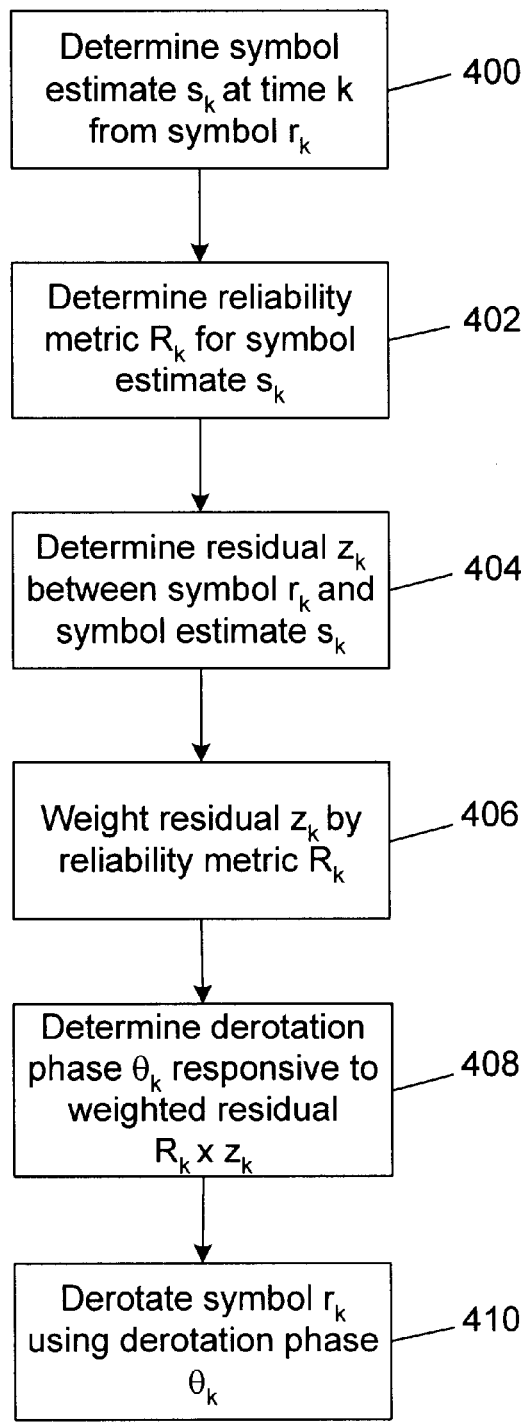
FIGS. 4A–4B are flowcharts illustrating embodiments of a carrier tracking method in accordance with the subject invention.

FIG. 4A illustrates an embodiment of a method for performing carrier phase tracking of received symbols in an embodiment employing a feedfoward structure. As illustrated, in step 400, an estimate $s_k$ of a received symbol $r_k$ is determined. Step 400 is followed by step 402, in which a reliability metric $R_k$ for the estimate $s_k$ is determined. Step 402 is followed by step 404 in which a residual $z_k$ is determined between the symbol $r_k$ and the estimate $s_k$. As discussed previously, the residual $z_k$ may be a phase residual $e_k$ or some other residual, such as the component of $r_k$ orthogonal to $s_k$. Step 404 is followed by step 406, in which the residual $z_k$ is weighted by the reliability metric $R_k$. Step 406 is followed by step 408, in which the derotation phase $\theta_k$ is determined responsive to the weighted residual $R_k \cdot z_k$. Optionally, one or more previous weighted residuals, or one or more previous values of the derotation phase, may also be used to perform this task. Step 408 is followed by step 410, in which the symbol $r_k$ is derotated using the derotation phase $\theta_k$. This process may then repeat itself for subsequent time periods.

Figure 4B:
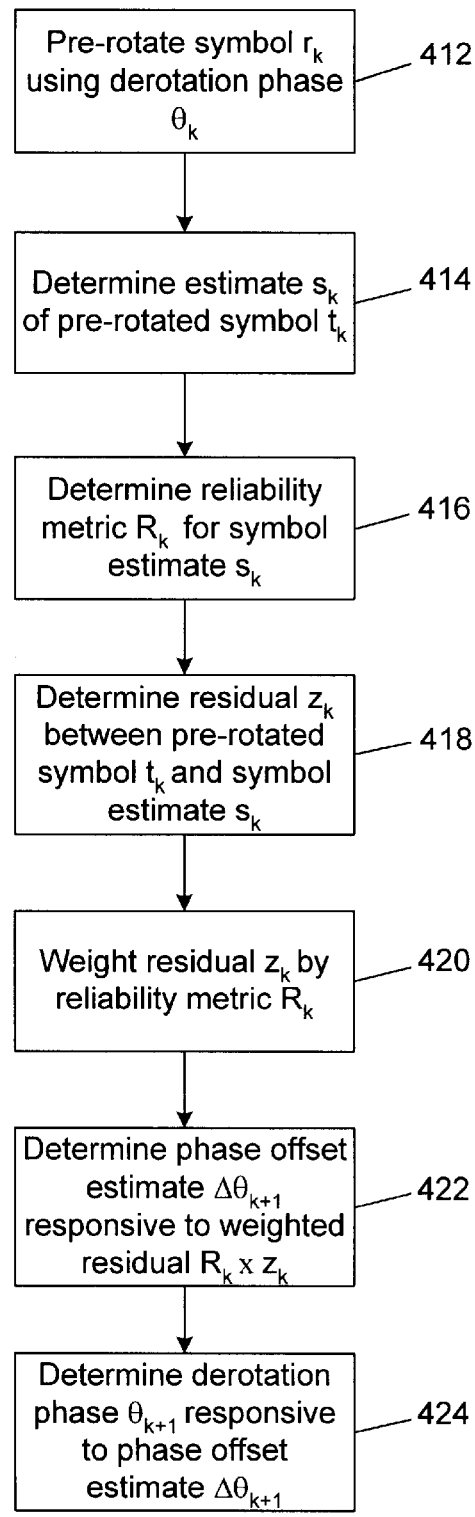

FIG. 4B illustrates an embodiment of a method for performing carrier phase tracking of received symbols in an embodiment employing a feedback structure. As illustrated, in step 412, a received symbol $r_k$ is pre-rotated using the best estimate of the derotation phase $\theta_k$ then available. Step 412 is followed by step 414, in which an estimate $s_k$ of the pre-rotated symbol $t_k$ is determined. Step 414 is followed by step 416, in which a reliability metric $R_k$ for the estimate $s_k$ is determined. Step 416 is followed by step 418 in which a residual $z_k$ is determined between the pre-rotated symbol $t_k$ and the estimate $s_k$. As discussed previously, the residual $z_k$ may be a phase residual $x_k$ or some other residual, such as the component of $t_k$ orthogonal to $s_k$. Step 418 is followed by step 420, in which the residual $z_k$ is weighted by the reliability metric $R_k$. Step 420 is followed by step 422, in which the phase offset estimate $\Delta\theta_k$ is determined responsive to the weighted residual $R_k \cdot z_k$. Optionally, one or more previous weighted residuals, or one or more previous values of the derotation phase, may also be used to perform this task. Step 422 is followed by step 424, in which the next derotation phase $\theta_{k+1}$ is determined by adding the phase offset estimate $\Delta\theta_{k+1}$ to the current derotation phase $\theta_k$. This process may then repeat itself for subsequent time periods.

Either of these processes may be tangibly embodied as a series of computer executable instructions stored on a computer readable medium including without limitation RAM, ROM, EPROM, EEPROM, floppy disk, hard disk, and CD-ROM. Either may also be synthesized or fabricated or embodied as digital logic, in an integrated circuit, or in a FPGA or PLA, for example.

In one embodiment of carrier tracking module 216, symbol and reliability estimation engine 210 is or includes a MAP decoder. For additional detail on MAP decoders, the reader is referred to "Optimal Decoding of Linear Codes for Minimizing Symbol Error Rate," L.R. Bahl et al., IEEE Transactions on Information Theory, March 1974, pp. 27–30 (hereinafter referred to as "the Bahl reference"); "Near Shannon Limit Error-Correcting Coding and Decoding: Turbo Codes," C. Berrou et al., Proc. ICC '93 Geneva, Switzerland, May 1993, pp. 1064–1070 (hereinafter referred to as "the Berrou reference"); "An Intuitive Justification and a Simplified Implementation of the MAP Decoder for Convolutional Codes," A. Viterbi, IEEE Journal On Selected Areas In Telecommunications, Vol. 16, No. 2, February 1998, pp. 260–264 (hereinafter referred to as "the Viterbi reference"); and J. Hagenauer and P. Hoeher, "A Viterbi Algorithm with Soft-decision outputs and its applications," in Proceedings of IEEE Globecom '89, Dallas, Tex., November 1989, pp. 47.1.1–47.1.7. ("the Hagenauer reference"). Each of the Bahl, Berrou, Viterbi, and Hagenauer references is hereby fully incorporated by reference herein as though set forth in full.

Figure 5:
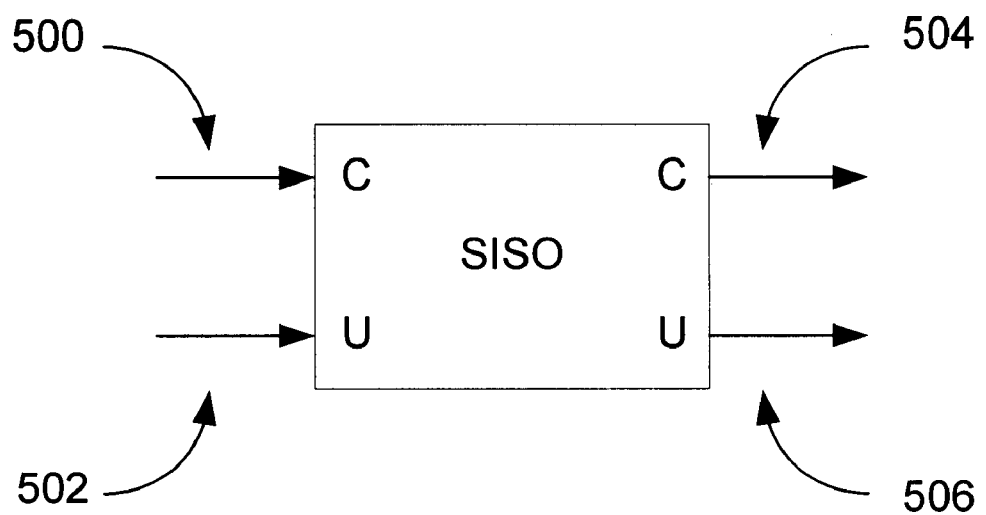
FIG. 5 is a block diagram of a SISO module.

The MAP decoder may be a log-MAP decoder, where the underlying probabilities are expressed in the natural log domain. A block diagram of one implementation of a log-MAP decoder is illustrated in FIG. 5. In this particular implementation, the decoder is a four port device known as a soft input soft output (SISO) module. The module has two inputs, a coded (C) symbol input 500, and an uncoded (U) bit input 502, and two outputs, a coded (C) symbol output 504, and an uncoded (U) bit output 506.

A priori information about the encoded symbols may be input to the C input 500 of the SISO. A priori information about the underlying source bits may be provided to the U input 502 of the SISO. A posteriori information about the encoded symbols may be provided at the C output 504 of the SISO. A posteriori information about the source bits may be output from the U output 506 of the SISO. The a posteriori information regarding the encoded symbols or source bits may be used to form estimates respectively of the encoded symbols or source bits, and reliability metrics for these estimates.

Figure 6:
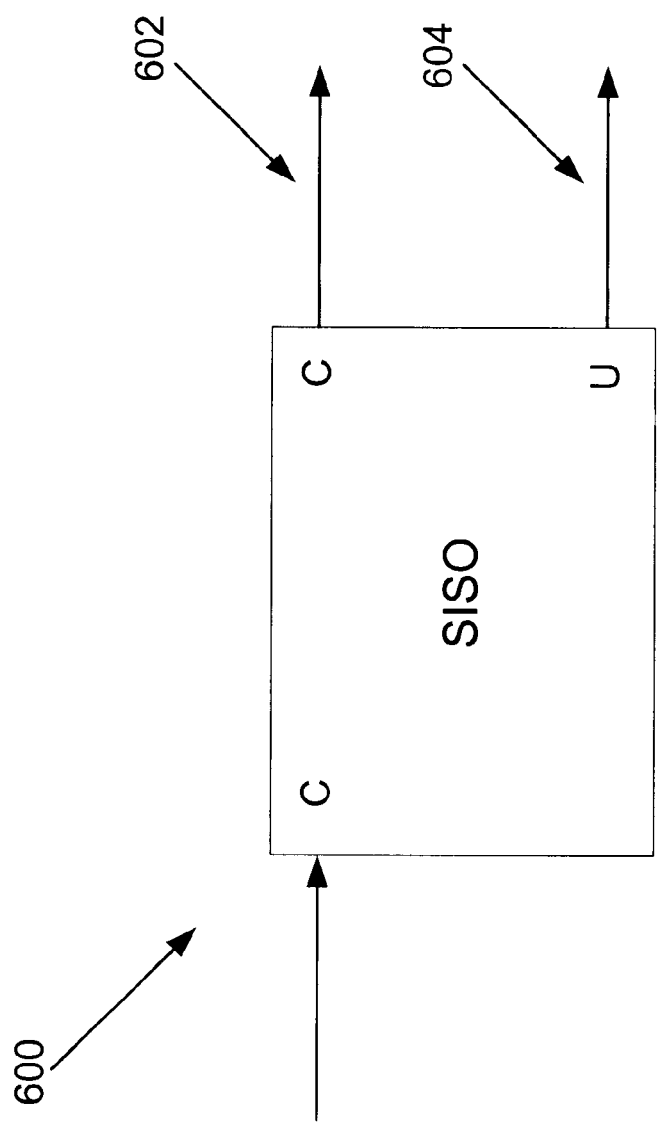
FIG. 6 illustrates a particular implementation of a SISO module.

FIG. 6 illustrates a particular implementation of a SISO when used as the symbol and reliability estimation module 214 in FIG. 2. In this particular application, coded channel symbols are provided to the C input 600. In the example illustrated, the U input is unused, but it should be appreciated that examples are possible in which a priori information is provided to the U input at the inception of the decoding process. The SISO them employs a log-MAP decoding process to decode the symbols. At the culmination of the process, estimates of the coded symbols are provided at the C output 602. In addition, a reliability metric for the estimate, derived from the log-likelihood value for the is provided at the U output 604. The log-likelihood value for the estimate represents the log-domain probability that the channel symbol is in fact the estimate.

The decoding process employed by this implementation of a SISO is a modified form of the algorithm described in the Bahl reference, with the specific modifications thereof being described in the Berrou reference. Both of these references were previously incorporated by reference.

Figure 7:
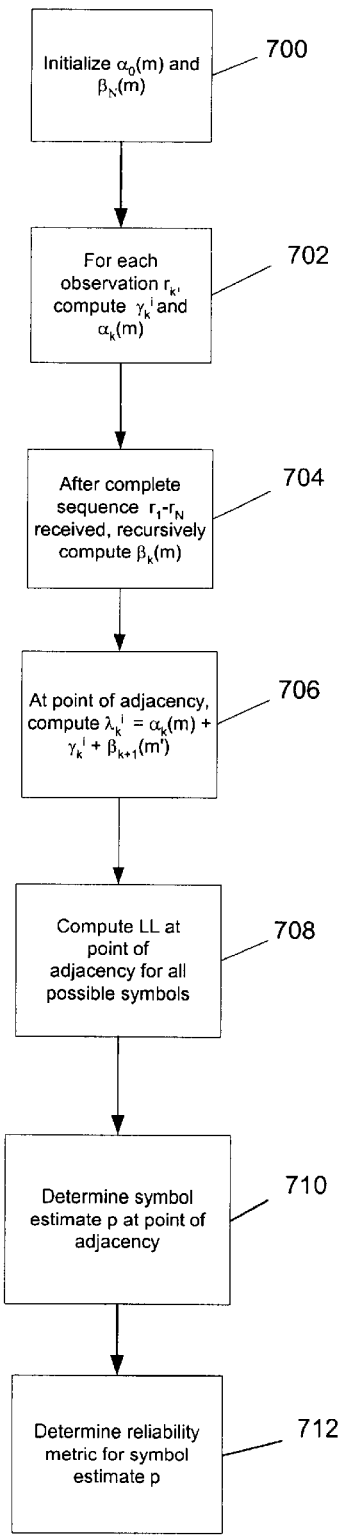
FIG. 7 is an embodiment of a log-MAP decoding process.

A flowchart of the process is illustrated in FIG. 7. In this flowchart, the notation $\alpha_k(m)$ refers to the natural log domain (hereinafter referred to as "log domain") forward probability of being in state m at time k; $\gamma_k^i$ refers to the log domain edge probability for edge i at time k; and $\beta_k(m)$ refers to the log domain reverse probability of being in state m at time k. It is assumed that a block of N channel symbols has been or will be received.

In step 700, the boundary values $\alpha_0(m)$ and $\beta_N(m)$ are initialized for all values of m.

In step 702, for an observation $r_k$, $\alpha_k(m)$ and $\gamma_k^i$ are computed for all values of m and i. Note that the "observation" $r_k$ is a channel symbol as perturbed by noise through passage through the channel. Advantageously, the forward probabilities $\alpha_k(m)$ are computed recursively as a function of $\alpha_{k-1}(m)$. In one implementation, this step is performed using equations (21) and (23) from the Berrou reference.

Figure 8:
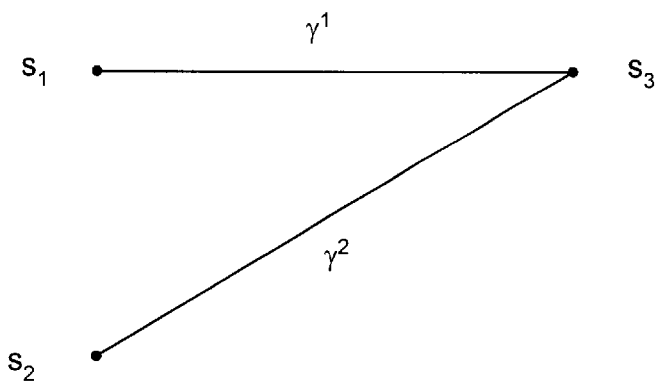
FIG. 8 is an example of the calculation of a forward state probability.

An example of the computation of forward probabilities is illustrated in FIG. 8. In this example, there are two permissible branches into state $S_3$, one from state $s_1$ and one from state $s_2$. The log domain probability of $s_1$, $\alpha(1)$, and the log domain probability of $s_2$, $\alpha(2)$, have been previously determined. Similarly, the log domain edge probabilities $\gamma^1$ and $\gamma^2$ have been previously determined. The objective is to compute the log domain probability of the state $s_3$, $\alpha(3)$, from the foregoing parameters.

In this example, the calculation of the probability $\alpha(3)$ can be expressed using the following equation:

$$\alpha(3)=MAX^*(\alpha(1)+\gamma^1,\alpha(2)+\gamma^2)$$

where the function MAX*(A,B) is defined to be:

$$MAX^*(A,B)=MAX(A,B)+\ln(1+\exp(-|A-B|))$$

Turning back to FIG. 7, in step 704, the reverse probabilities $\beta_k(m)$ are computed for all values of m. Advantageously, the probabilities $\beta_k(m)$ are computed recursively as a function of $\beta_{k+1}(m)$. In one implementation, this step is performed using equation (22) from the Berrou reference.

Figure 9:
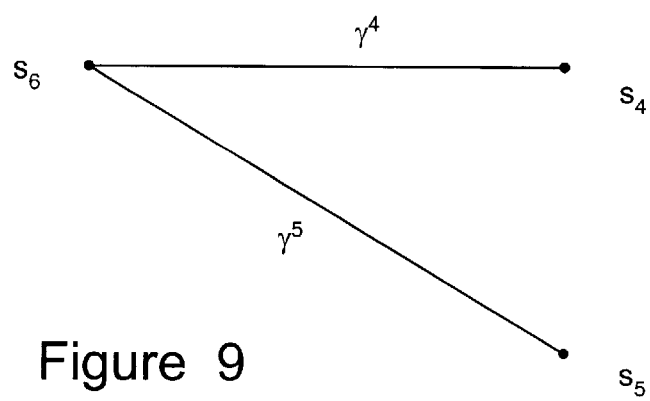
FIG. 9 is an example of the calculation of a reverse state probability.

An example of the computation of reverse probabilities is illustrated in FIG. 9. In this example, there are two permissible branches into state $s_6$, one from state $s_4$ and one from state $s_5$. The log domain probability of $s_4$, $\beta(4)$, and the log domain probability of $s_5$, $\beta(5)$, have been previously determined. Similarly, the log domain edge probabilities $\beta^4$ and $\beta^5$ have been previously determined. The objective is to compute the log domain probability of the state $s_6$, $\beta(6)$, from the foregoing parameters.

In this example, the calculation of the natural log domain probability $\beta(6)$ can be expressed using the following equation:

$$\beta(6)=MAX^*(\beta(4)+\gamma^4,\beta(5)+\gamma^5)$$

where the function MAX*(A,B) is defined as before.

Figure 10:
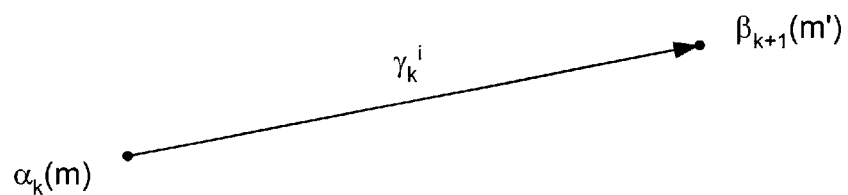
FIG. 10 is an example of the calculation of a forward transition probability.

Turning back to FIG. 7, in step 706, at the point where the computation of the forward and reverse probabilities begins to overlap, i.e., a point of adjacency, the joint log domain probabilities $\lambda_k^i=\alpha_k(m)+\gamma_k^i+\beta_{k+i}(m')$ are computed for all edges at the point of overlap. An example of this computation is illustrated in FIG. 10. Referring to the leftmost state as state m at time k, and the rightmost state as state m' at time k+1, it is assumed that the forward state log domain probability $\alpha_k(m)$, the reverse state log domain probability $\beta_{k+1}(m')$, and the edge log domain probability $\gamma_k^i$ have all been computed. This step involves adding these probabilities, i.e., performing the computation $\lambda_k^i=\alpha_k(m)+\gamma_k^i+\beta_{k+1}(m')$ in order to compute the joint log domain probability of transitioning between the two states along the prescribed edge.

Turning back to FIG. 7, in step 708, a log-likelihood, $LL_k$, is determined for the symbols at the point of adjacency k. The log-likelihood for a symbol s at time k, $LL_k(P)$, may be expressed by the following equation:

$$LL_k(s)=MAX^*_{\forall i \text{ that imply release of a symbol } s(\lambda_k^i)}-MAX^*_{\forall i}(\lambda_k^i)$$

In step 710, an estimate p of the symbol at the point of adjacency k is taken to be the symbol p which has the largest LL value. This condition may be expressed as follows:

$$LL_k(p)=MAX_{\forall s}(LL_k(s))$$

In step 712, a reliability metric for the symbol estimate p is derived from $LL_k$ (p). In one example, the reliability metric for the symbol p is $LL_k$ (p) converted into the normal probability domain. This conversion step may be represented as follows:

$$RM_k(p)=e^{LL_k(p)}$$

where $RM_k(p)$ is the reliability metric for the estimate p at time k.

Figure 11:
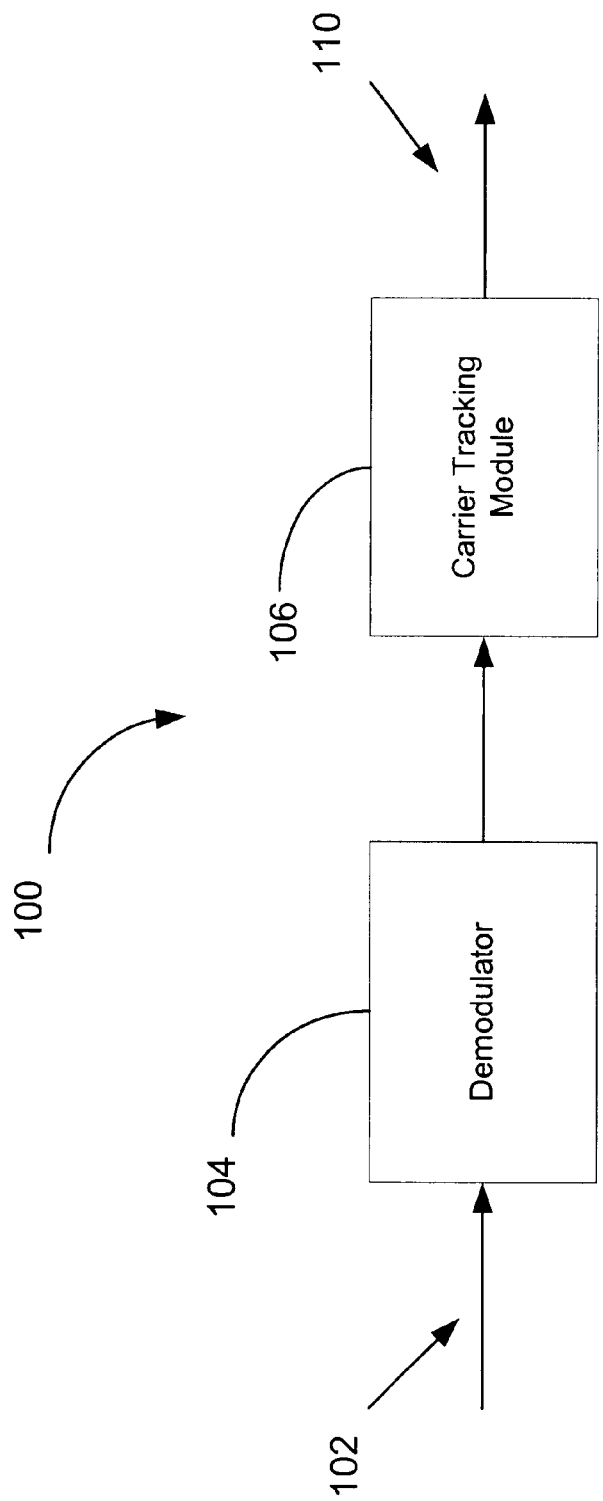
FIG. 11 is a block diagram of a second embodiment of a receiver incorporating the subject invention.

A second embodiment of a receiver 100 according to the subject invention is illustrated in FIG. 11. Compared to the embodiment illustrated in FIG. 1, one notable difference is the absence in FIG. 11 of decoder 108. This is because, in the block diagram of FIG. 11, the function of decoder 108 is performed by the symbol and reliability estimation engine 204 within carrier tracking module 106.

Figure 12A:
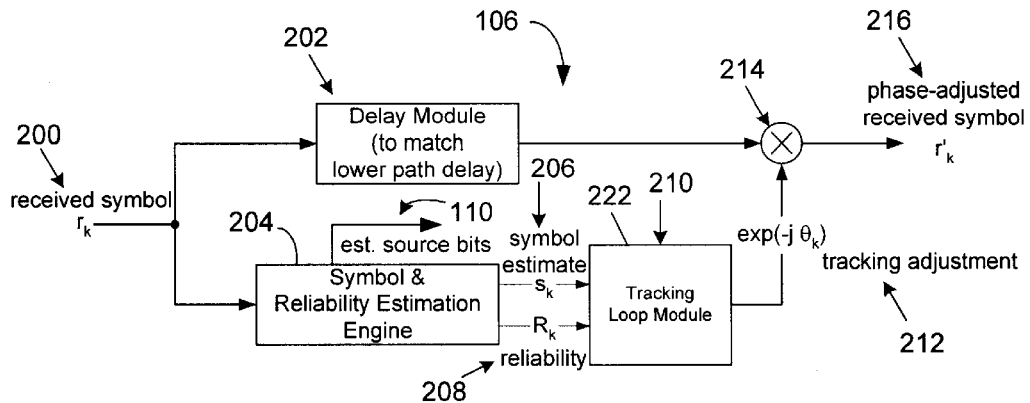
FIGS. 12A–12B are block diagrams of additional embodiments of a carrier tracking module in accordance with the subject invention.

FIG. 12A illustrates an embodiment of the tracking loop module 106 configured for use in the receiver of FIG. 11. One notable difference between the embodiment of FIG. 12A and that of FIG. 2A is that the estimated source bits 110 in FIG. 12A are output from engine 204, rather than decoder 108 in FIG. 1. That is because, in this embodiment, decoder 108 can be eliminated, since its function is performed by engine 204.

Figure 12B:
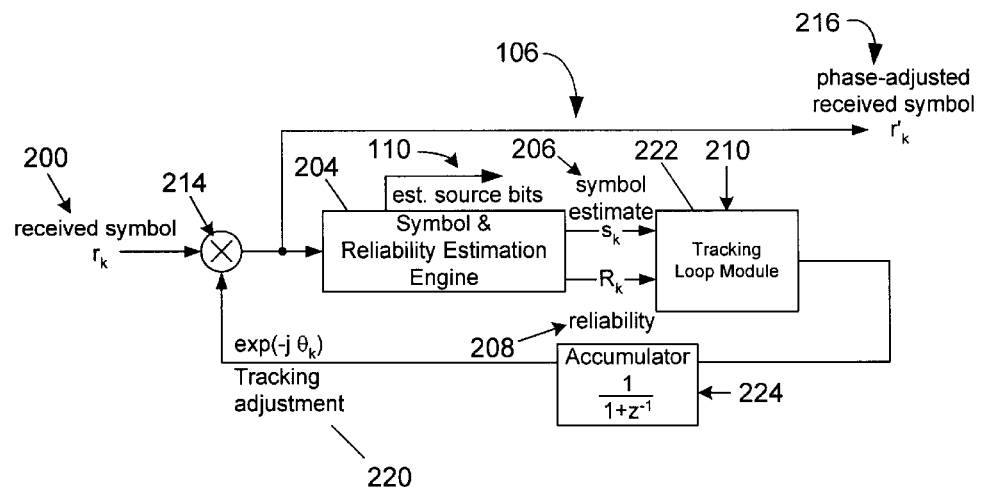

FIG. 12B illustrates a second embodiment of the tracking loop module 106 configured for use in the receiver of FIG. 11. Again, a notable difference between the embodiment of FIG. 12B and that of FIG. 2B is that the estimated source bits 110 in FIG. 12B are output from engine 204, rather than decoder 108. Again, decoder 108 can be eliminated since its function is performed by engine 204.

By employing reliability metrics in the tracking loop, a system according to the invention is better able, compared to the prior art, to track phase trends induced by instabilities in the demodulator oscillator at low $E_b/N_o$ values or high phase noise in the demodulator oscillator.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A system comprising:
   a symbol derotator for pre-rotating a symbol $r_k$ by a derotation phase;
   a symbol and reliability estimation engine for determining, responsive to the pre-rotated symbol $t_k$, a symbol estimate $s_k$ and a reliability metric $R_k$ for the estimate;
   a tracking loop module configured to (a) determine a residual $z_k$ between the pre-rotated symbol $t_k$ and the symbol estimate $s_k$; (b) weight the residual $z_k$ by the reliability metric $R_k$ for the estimate $s_k$; and (c) determine a phase offset estimate $\Delta\theta_{k+1}$ responsive to a weighted residual $R_k \cdot z_k$; and
   an accumulator for determining a next derotation phase $\theta_{k+1}$ responsive to the phase offset estimate $\Delta\theta_{k+1}$.

2. The system of claim 1 wherein the symbol derotator is a modulator.

3. The system of claim 1 wherein the residual $z_k$ is a phase residual $x_k$.

4. The system of claim 1 wherein the residual $z_k$ is a component of $t_k$ orthogonal to $s_k$.

5. The system of claim 1 wherein the tracking loop module is configured to determine the phase offset estimate $\Delta\theta_{k+1}$ in accordance with the following expression:

$$\Delta\theta_{k+1} = \sum_{i=0}^{N-1} a_i \cdot \Delta\theta_{k-i} + \sum_{i=0}^{M-1} b_i \cdot R_{k-i} \cdot z_{k-i}$$

where $\Delta\theta_{k+1}$ is the phase offset estimate at time k+1, $\Delta\theta_{k-i}$ represents a previous value of the phase offset estimate at time k−i, $a_i$ is a coefficient applied to $\Delta\theta_{k-i}$, $z_{k-i}$ is a residual between the pre-rotated symbol $t_{k-i}$ and the estimate $s_{k-i}$ of the (k−i)th symbol, $R_{k-i}$ is the reliability metric for the estimate of the (k−i)th symbol, $b_i$ is a coefficient applied to $R_{k-i} \cdot z_{k-i}$, and M and N are non-negative integers.

6. The system of claim 1 wherein the symbol and reliability estimation engine includes a decoder which provides soft symbol estimates.

7. The system of claim 4 wherein the orthogonal component $y_k$ is given by the following expression:

$$y_k=|t_k|\sin\phi_k$$

where $t_k$ is the pre-rotated symbol at time k, and $\phi k$ is the phase difference between $r_k$ and the estimate $s_k$.

8. The system of claim 7 wherein the accumulator is configured to determine the derotation phase $\theta_{k+1}$ in accordance with the following expression:

$$\theta_{k+1}=\theta_k+\Delta\theta_{k+1}$$

where $\theta_{k+1}$ is the derotation phase at time k+1, $\theta_k$ is the derotation phase at time k, and $\Delta\theta_{k+1}$ is the phase offset estimate at time k+1.

9. The system of claim 6 wherein the decoder is selected from the group composing a Maximum A Posteriori (MAP) decoder, a log-MAP decoder, a Soft Output Viterbi (SOVA) decoder, or a Max-Log MAP decoder.

10. The system of claim 9 wherein the symbol and reliability estimation engine is a MAP decoder.

11. The system of claim 9 wherein the symbol and reliability estimation engine is a log-MAP decoder.

12. The system of claim 11 wherein the log-MAP decoder provides a symbol estimate p at time k such that the log-likelihood of p at time k, $LL_k(p)$, is a maximum over one or more possible symbols at that time.

13. The system of claim 12 wherein the reliability metric for the estimate p is derived from $LL_k(p)$.

14. The system of claim 1 in a receiver where the output of the symbol and reliability estimation engine is provided to a decoder which provides estimates of underlying source bits.

15. The system of claim 1 in a receiver where the symbol and reliability estimation engine provides estimates of underlying source bits.

16. The receiver of any of claims 14 or 15 in a communications device.

17. The receiver of any of claims 14 or 15 in a set-top box.

18. A system comprising:
   a symbol and reliability estimation engine for determining, responsive to a symbol $r_k$, a symbol estimate $s_k$ and a reliability metric $R_k$ for the estimate;
   a tracking loop module configured to (a) determine a residual $z_k$ between the symbol $r_k$ and the symbol estimate $s_k$; (b) weight the residual $z_k$ by the reliability metric $R_k$ for the estimate $s_k$; and (c) determine a derotation phase $\theta_k$ responsive to a weighted residual $R_k \cdot z_k$; and
   a symbol derotator for de-rotating the symbol $r_k$ by the derotation phase $\theta_k$.

19. The system of claim 18 wherein the symbol derotator is a modulator.

20. The system of claim 18 wherein the residual $z_k$ is a phase residual $e_k$.

21. The system of claim 18 wherein the residual $z_k$ is a component of $r_k$ orthogonal to $s_k$.

22. The system of claim 18 wherein the tracking loop module is configured to determine the derotation phase $\theta_k$ in accordance with the following expression:

$$\theta_k = \sum_{i=1}^{N} a_i \cdot \theta_{k-i} + \sum_{i=0}^{M-1} b_i \cdot R_{k-i} \cdot z_{k-i}$$

where $\theta_k$ is the derotation phase at time k, $\theta_{k-i}$ represents a previous value of the derotation phase at time k−i, $a_i$ is a coefficient applied to $\theta_{k-i}$, $z_{k-i}$ is a residual between the symbol $r_{k-i}$ and the estimate $s_{k-i}$ of the (k−i)th symbol, $R_{k-i}$ is the reliability metric for the estimate of the (k−i)th symbol, $b_i$ is a coefficient applied to $R_{k-i} \cdot z_{k-i}$, and M and N are non-negative integers.

23. The system of claim 21 wherein the orthogonal component $y_k$ is given by the following expression:

$$y_k = |r_k| \sin \phi_k$$

where $r_k$ is the symbol at time k, and $\phi_k$ is the phase difference between $r_k$ and the estimate $s_k$ of that symbol.

24. The system of claim 18 wherein the symbol and reliability estimation engine includes a decoder which provides soft symbol estimates.

25. The system of claim 24 wherein the decoder is selected from the group composing a Maximum A Posteriori (MAP) decoder, a log-MAP decoder, a Soft Output Viterbi (SOVA) decoder, or a Max-Log MAP decoder.

26. The system of claim 25 wherein the symbol and reliability estimation engine is a MAP decoder.

27. The system of claim 25 wherein the symbol and reliability estimation engine is a log-MAP decoder.

28. The system of claim 27 wherein the log-MAP decoder provides a symbol estimate p at time k such that the log-likelihood of p at time k, $LL_k(p)$, is a maximum over one or more possible symbols at that time.

29. The system of claim 28 wherein the reliability metric for the estimate p is derived from $LL_k(p)$.

30. The system of claim 18 in a receiver where the output of the symbol and reliability estimation engine is provided to a decoder which provides estimates of underlying source bits.

31. The system of claim 18 in a receiver where the symbol and reliability estimation engine provides estimates of underlying source bits.

32. The receiver of any of claims 30 or 31 in a communications device.

33. The receiver of any of claims 30 or 31 in a set-top box.

34. The system of claim 18 further comprising a delay element for delaying the symbol $r_k$ before input to the symbol derotator.

35. A system comprising:
symbol derotation means for pre-rotating a symbol $r_k$ by a derotation phase;
symbol and reliability estimation means for determining, responsive to the pre-rotated symbol $t_k$, a symbol estimate $s_k$ and a reliability metric $R_k$ for the estimate;
tracking loop means for (a) determining a residual $z_k$ between the pre-rotated symbol $t_k$ and the symbol estimate $s_k$; (b) weighting the residual $z_k$ by the reliability metric $R_k$ for the estimate $s_k$; and (c) determining a phase offset estimate $\Delta\theta_{k+1}$ responsive to a weighted residual $R_k \cdot z_k$; and
accumulation means for determining a next derotation phase $\theta_{k+1}$ responsive to the phase offset estimate $\Delta\theta_{k+1}$.

36. A system comprising:
symbol and reliability estimation means for determining, responsive to a symbol $r_k$, a symbol estimate $s_k$ and a reliability metric $R_k$ for the estimate;
tracking loop means for (a) determining a residual $z_k$ between the symbol $r_k$ and the symbol estimate $s_k$; (b) weighting the residual $z_k$ by the reliability metric $R_k$ for the estimate $s_k$; and (c) determining a derotation phase $\theta_k$ responsive to a weighted residual $R_k \cdot z_k$; and
symbol derotation means for de-rotating the symbol $r_k$ by the derotation phase $\theta_k$.

37. The system of any of claims 1, 18, 35 or 36 in combination with a demodulator.

38. The combination of claim 37 further in combination with a decoder.

39. A method comprising the steps of:
pre-rotating a symbol $r_k$ by a de-rotation phase $\theta_k$;
determining an estimate $s_k$ of the symbol responsive to the pre-rotated symbol $t_k$;
determining a reliability metric $R_k$ for the estimate $s_k$;
determining a residual $z_k$ between the pre-rotated symbol $t_k$ and the estimate $s_k$;
weighting the residual $z_k$ by the reliability metric $R_k$; and
determining a next derotation phase $\theta_{k+1}$ responsive to a weighted residual $R_k \cdot z_k$.

40. The method of claim 39 wherein the residual is a phase residual $x_k$.

41. The method of claim 39 wherein the residual is a component of the pre-rotated symbol $t_k$ orthogonal to the symbol estimate $s_k$.

42. The method of claim 39 further comprising determining the next derotation phase $\theta_{k+1}$ in accordance with the following two step process:

$$\Delta\theta_{k+1} = \sum_{i=0}^{N-1} a_i \cdot \Delta\theta_{k-i} + \sum_{i=0}^{M-1} b_i \cdot R_{k-i} \cdot z_{k-i}$$

$$\theta_{k+1} = \theta_k + \Delta\theta_{k+1}$$

where $\Delta\theta_{k+1}$ is the carrier phase offset at time k+1, $\Delta\theta_{k+1}$ is the derotation phase at time k+1, $\theta_k$ is the derotation phase at time k, $\Delta\theta_{k-i}$ is the phase offset estimate at time k−i, $a_i$ is a coefficient applied to $\Delta\theta_{k-i}$, $z_{k-i}$ is a residual between the pre-rotated symbol $t_{k-i}$ and the estimate $s_{k-i}$ of the (k−i)th symbol, $R_{k-i}$ is the reliability metric for the estimate of the (k−i)th symbol, $b_i$ is a coefficient applied to $R_{k-i} \cdot z_{k-i}$, and M and N are non-negative integers.

43. The method of claim 41 wherein the $y_k$, the component of $t_k$ orthogonal to $s_k$, is given by the following espression:

$$y_k = |r_k| \cdot \sin \phi_k$$

where $r_k$ is the symbol at time k, $s_k$ is the estimate of that symbol, and $\phi_{k-i}$ is the phase difference between $r_k$ and $s_k$.

44. The method of claim 39 further providing estimates of the underlying source bits.

45. A method comprising the steps of:
determining an estimate $s_k$ of a symbol $r_k$;

determining a reliability metric $R_k$ for the estimate $s_k$;

determining a residual $z_k$ between the symbol $r_k$ and the estimate $s_k$;

weighting the residual $z_k$ by the reliability metric $R_k$;

determining a derotation phase $\theta_k$ responsive to a weighted residual $R_k \cdot z_k$; and derotating the symbol $r_k$ by the derotation phase $\theta_k$.

46. The method of claim 45 wherein the residual is a phase residual $e_k$.

47. The method of claim 45 wherein the residual is a component of the symbol $r_k$ orthogonal to the symbol estimate $s_k$.

48. The method of claim 45 further comprising determining the derotation phase $\theta_k$ in accordance with the following:

$$\theta_k = \sum_{i=1}^{N} a_i \cdot \theta_{k-i} + \sum_{i=0}^{M-1} b_i \cdot R_{k-i} \cdot z_{k-i}$$

where $\theta_k$ is the derotation phase at time k, $\theta_{k-i}$ is the derotation phase at time k–i, $a_i$ is a coefficient applied to $\theta_{k-i}$, $z_{k-i}$ is a residual between the symbol $r_{k-i}$ and the estimate $s_{k-i}$ of the (k–i)th symbol, $R_{k-i}$ is the reliability metric for the estimate of the (k–i)th symbol, $b_i$ is a coefficient applied to $R_{k-i} \cdot z_{k-i}$, and M and N are non-negative integers.

49. The method of claim 47 wherein $y_k$, the component of $r_k$ orthogonal to $s_k$, is given by the following espression:

$$y_k = |r_k| \cdot \sin\phi_k$$

where $r_k$ is the symbol at time k, $s_k$ is the estimate of that symbol, and $\phi_{k-1}$ is the phase difference between $r_k$ and $s_k$.

50. The method of claim 45 further comprising providing estimates of the underlying source bits.

51. A computer readable medium memory tangibly embodying the method steps of any of claims 39–50.

52. The computer readable medium of claim 51 which comprises a memory.

53. Circuitry that embodies the method steps of any of claims 39–50.

54. The circuitry of claim 53 which comprises synthesized logic.

55. The circuitry of claim 53 which comprises a field programmable logic array (FPLA).

56. The circuitry of claim 53 which comprises an integrated circuit.

57. A method comprising the steps of:

a step for pre-rotating a symbol $r_k$ by a de-rotation phase $\theta_k$;

a step for determining an estimate $s_k$ of the symbol responsive to the pre-rotated symbol $t_k$;

a step for determining a reliability metric $R_k$ for the estimate $s_k$;

a step for determining a residual $z_k$ between the pre-rotated symbol $t_k$ and the estimate $s_k$;

a step for weighting the residual $z_k$ by the reliability metric $R_k$; and a step for determining a next derotation phase $\theta_k$ responsive to a weighted residual $R_k \cdot z_k$.

58. A method comprising the steps of:

a step for determining an estimate $s_k$ of a symbol $r_k$;

a step for determining a reliability metric $R_k$ for the estimate $s_k$;

a step for determining a residual $z_k$ between the symbol $r_k$ and the estimate $s_k$;

a step for weighting the residual $z_k$ by the reliability metric $R_k$;

a step for determining a derotation phase $\theta_k$ responsive to a weighted residual $R_k \cdot z_k$; and a step for derotating the symbol $r_k$ by the derotation phase $\theta_k$.

\* \* \* \* \*